United States Patent

Moorhead

Patent Number: 5,354,467
Date of Patent: Oct. 11, 1994

[54] SIEVE BEND

[75] Inventor: Robert G. Moorhead, Blairsville, Pa.

[73] Assignee: Electric Power Research Institute, Palo Alto, Calif.

[21] Appl. No.: 587,524

[22] Filed: Sep. 24, 1990

Related U.S. Application Data

[63] Continuation of Ser. No. 343,425, Apr. 26, 1989, abandoned, which is a continuation-in-part of Ser. No. 246,314, Sep. 12, 1988, Pat. No. 4,981,587.

[51] Int. Cl.$^5$ .............................................. B01D 33/80
[52] U.S. Cl. .................................. 210/420; 210/456; 210/498; 210/499; 209/253; 209/273; 209/281
[58] Field of Search .................. 209/253, 273, 281; 210/420, 456, 498, 499

[56] References Cited

U.S. PATENT DOCUMENTS

| | | | |
|---|---|---|---|
| 2,076,297 | 4/1937 | Gray | 209/281 |
| 3,007,574 | 11/1961 | Koning | 209/281 |
| 3,353,674 | 11/1967 | Leeman | 209/281 |
| 4,120,790 | 10/1978 | Tinker et al. | 209/281 |
| 4,251,356 | 2/1981 | Harte | 209/281 |
| 4,512,880 | 4/1985 | Connally | 209/273 |
| 4,710,296 | 12/1987 | Connolly | 210/420 |

Primary Examiner—Robert A. Dawson
Assistant Examiner—W. L. Walker
Attorney, Agent, or Firm—Flehr, Hohbach, Test, Albritton & Herbert

[57] ABSTRACT

Apparatus of the type known as Sieve Bends which serve to separate particles differing in size. The apparatus includes a headbox that receives feed slurry and a throat that receives the slurry from the headbox. Means is provided in the throat for yieldably engaging the flow in such a manner as to prevent or minimize clogging of the slots between the bars of a sieve that receives the flow from the throat. This means includes a nip flap which contacts one side of the slurry flow. The invention makes possible a substantial increase in operating capacity and is particularly applicable to the coal industry.

15 Claims, 4 Drawing Sheets

SIEVE BEND

This is a continuation of application Ser. No. 07/343,425 filed Apr. 26, 1989 now abandoned, a continuation-in-part of No. 07/246,314 filed Sep. 12, 1988, U.S. Pat. No. 4,981,587.

This application relates generally to the construction and mode of operation of sieves of the bend type. It has application for the separation and sizing of solid particles dispersed in a liquid medium as a slurry. Particularly it pertains to such apparatus and methods that are applicable to the coal and mineral industry to produce two products, one comprising fine particles and the other coarse particles complying with size and quality specifications.

This application is a continuation-in--part of co-pending application Ser. No. 246,314, filed Sep. 12, 1988, entitled SIEVE BEND, in the name of Robert G. Moorhead, which is now U.S. Pat. No. 4,981,587 and assigned to Electric Power Research Institute, Inc., a corporation of the District of Columbia.

BACKGROUND

Various types of separation apparatus and methods have been used for the separation of fine solid particles from a medium in which they are dispersed. Particular reference can be made to simple sieve racks, hydrocyclones, and other types of apparatus making use of hydraulic separation. In both the coal and mineral industries, special techniques are employed to concentrate the assay value of an ore through processes based on either the specific-gravity or surface characteristics of the ore particles. However, essentially all processes used to concentrate the assay of an ore or coal have deteriorating performance as the particle size decreases. This results in the purity of the product decreasing with particle size. Various sizing apparatus have been used after the concentration process to sort similar quality particles by size with the objective of retrieving the desired quality particles as a product and sending the remaining sizes either to further processing or to discard, depending on their quality. Some specific gravity based beneficiation techniques employ a heavy media suspension, comprised of very fine sized magnetite or ferrosilicon (less than 0.04 mm diameter) and water, to separate lighter specific gravity ore or coal particles from heavier specific gravity particles. Preceding the introduction of the feed into the heavy-media suspension, a desliming step is typically used to remove fine size particles from the remaining coarser size feed fraction to insure the media does not become contaminated with fine, non-magnetic material. In addition, after the gravity separation step is complete, the media must be separated from the product and discard streams to insure an uncontaminated product and to also permit recovery and reuse of the magnetite.

In the above industrial practice, the sizing operation requires a device that can effectively remove finer than 0.044 mm diameter (separating size ranging from 0.21 mm to 0.044 mm) from the coarser size particles with the device separating these particles predominantly by physical size, exclusive of particle specific gravity. In general it may be said that all particle processing industries that concentrate a substance are in need of a simple apparatus and methods which will make it possible to produce a desired size product that will comply with quality specifications.

SUMMARY OF THE INVENTION

The present invention comprises a separating bend with certain unique features. Particularly, means is provided which subjects the flow of feed slurry through the throat of the headbox in such a manner that it is subject to gravitational force induced head pressure that is automatically and manually adjustable. Flow of the feed slurry from the lower end of the throat is so controlled that it is resistant to clogging. More specifically, when oversized particles obstruct the throat, the level of feed in the headbox increases. This in turn increases the static head on the throat. The throat yields to the increased head pressure, causing its passageway to open. This mode of operation has the effect of clearing the throat mechanism of any debris if any debris builds up in the throat area. The sieve rack is preferably provided with tapping means to aid in removing clogging material from the slots between the sieve screen bars.

One embodiment of the invention employs a sieve rack which is adjustably mounted in such a manner that additional sieve area can be exposed to the discharging slurry. This makes it possible for the sieve rack to be used over extended periods without impairing its efficiency.

Figure 1:
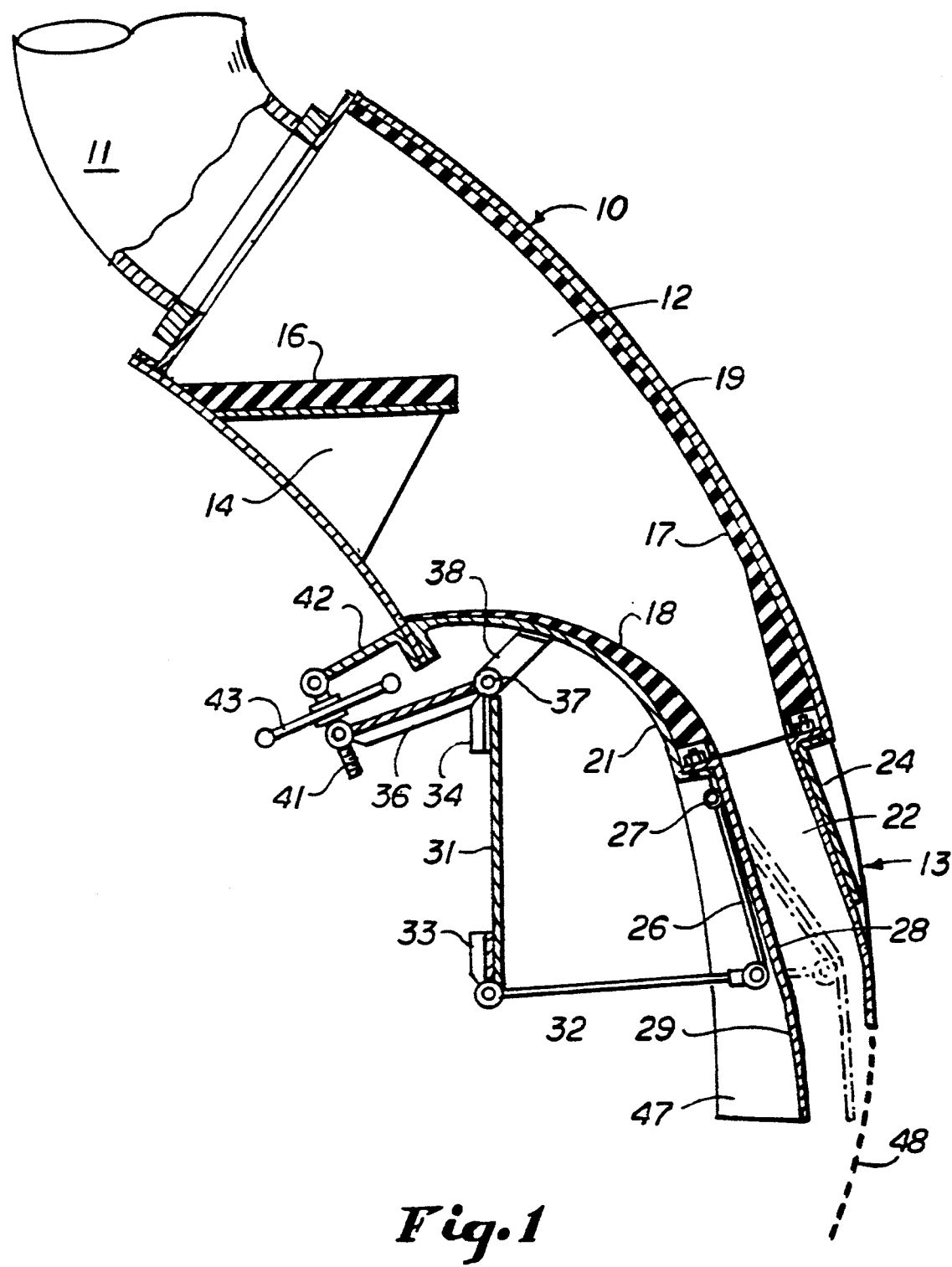
FIG. 1 is a cross-sectional view of a sieve bend headbox incorporating the present invention.

The embodiment of the invention illustrated in FIG. 1 consists of a headbox 10 which has its upper inlet end connected to the slurry supply conduit 11. As it appears in cross section, the headbox provides a flow passage 12 and has a throat 13 at its lower end. The side walls are laterally spaced apart (as for example, to provide a lateral dimension of between 24 and 72 inches). In normal operation, slurry or like feed material is supplied by suitable pumping or gravity flow means to the conduit 11 and sufficient slurry is introduced into the headbox to maintain a level somewhat below the level of the overflow opening. The headbox is so constructed that the passage way 12 is of gradually reduced cross sectional flow area for its lower portion. The upper portion of the headbox is shown provided with a shelf or shoulder 14, which may be shown provided with a wear resistant facing 16 of resilient material, such as synthetic or natural rubber. Similar linings 17 and 18 may be provided for the outer and inner walls 19 and 21.

The throat 13 may be attached to or a part of the lower portion of the headbox. The outer convex side of the passage way 22 is defined by the fixed wall 24, and the inner side by the plate 26. A pivot 27 serves to attach the upper edge of the plate 26 with a fixed portion of the headbox, as for example, the lower edge of the headbox as shown in FIG. 1. Thus, the plate 26 may swing between the position shown in FIG. 1 and the position illustrated by dotted lines. Overlying the plate 26, there is a sheet 28 which has its upper margin secured to the lower margin of the wall 21 and its lateral margins secured to the side walls 47 to form a watertight seal between these three margins of sheet 28 and the fixed walls of the box, 47 and 21. The lower portion extended downwardly beyond the lower end of the sheet 26 to form a nip flap 29. This sheet likewise is made of suitable resilient material such as natural or synthetic rubber. The plate 26 is attached to means which serves to adjust its position during operation of the sieves bend. The means employed for this purpose shown in FIG. 1 consists of a metal strip 31 which functions as a spring when bent laterally. A member 32 is pivotally attached to the lower portion of the plate 26, and its other end is secured to the member 33, which in turn is secured to the lower end of the spring strip 31. The upper end of the spring strip is shown secured to member 34 which is a part of the member 36. Both members 34 and 36 have a pivotal connection 37 with the supporting bracket 38. The arrangement described above makes possible movements of the plate 26 in one direction or the other and against the spring action of the strip 31.

Manually adjusting means is also provided for plate 26. Thus the wall 21 is provided with a threaded rod 41 which has its upper end attached to the bracket 42. A nut that is a part of the handwheel 43 is threaded upon the rod 41. When the handwheel is turned the member 36 moves relative to the member 42 to bend the spring strip 31 in one direction or the other. However, hydraulic, electric or pneumatic operators may also be used to make these manual adjustments.

The outer wall 24 of the throat is terminated at its lower end at a level above the level of the lower end of wall 47. A sieve assembly 48 or sieve rack is schematically illustrated and has its upper portion attached to the lower end of wall 24. The arrangement and the dimensions are such that the nip flap 29 extends for a substantial distance (e.g., 1½ to 3 inches) alongside the sieve.

Figure 5:
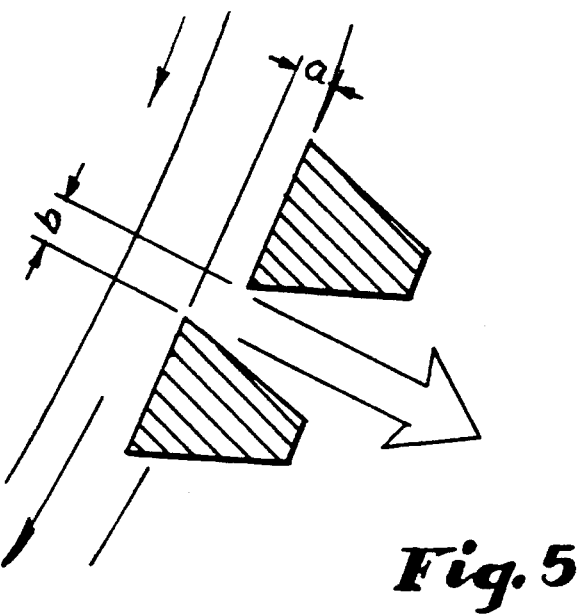
FIG. 5 is a schematic detail showing sieve bars such as are suitable for use with the invention.

A suitable sieve screen assembly may have bars substantially as illustrated in FIG. 5. In this instance, the bars are triangular shaped as viewed in cross section, and are connected together to form a sieve rack assembly. The slurry flow is directed across the end faces of the bars substantially as indicated by the arrows in FIG. 5. The smaller solid particles of material are of a size that they pass through the slots between the bars. The larger particles which cannot pass through the slots, continue flowing over the sieve bars. In normal operation, a sieve of this character has what is termed a slicing action, and as the slurry passes over the bars, thin slices are removed with the smaller particles passing through the slots between the bars. Wear through usage erodes the surfaces exposed to the flow and can gradually reduce the separating size overtime as each bar slices a thinner section of slurry and diverts it into the slot. Schematic FIG. 5 indicates a slice (a) of the slurry flow being diverted through the slot and also (b) the width of the slot. The separation is made by the thickness of the slurry slices diverted by the bars.

The method of operation of a sieve bend constructed as described above, is as follows: a slurry containing solid particles, some larger than the smaller particles which cannot pass through the slots of the sieve, is delivered into the upper part of the headbox which supplies the slurry through the throat and over the sieve rack. Adjustment of the slurry level within the upper part of the headbox serves to control the velocity of the slurry as it exits the throat and enters upon the sieve. The outer side of the flow through the throat is defined by the wall 24. Plate 26 forms the inner wall for the throat. Due to the arcuate shaping of the headbox and the flow passage through the same, some centrifugal force is developed which tends to urge the slurry against the wall 49 and the outer wall 24 of the throat. Minor changes in flow velocity of slurry through the throat, and through the flow passage between the outer wall 24 and the plate 26 are compensated for by compensating movements of the plate as permitted by the yieldable means formed by the spring 31. Such compensating adjustments occur automatically. The nip flap 29 plays a part in this automatic compensation. The rapid flow of slurry past and in contact with the flap serves to create a reduction in pressure at the interface of the flap and the slurry which serves to cause the flap to press against the flow by atmospheric pressure. This pressure upon the flow is deemed to aid in assuring that the slurry immediately contacts the screen, thus making possible increased operating capacity.

Aside from the automatic or dynamic compensation described above, the apparatus provides a manual adjustment. Thus by turning the wheel 43, the spring strip 31 can be flexed to apply increased force against the plate 26, or to permit the plate to be retracted. Such adjustments may be desirable when there is a substantial change in the character of the slurry or its rate of delivery to the headbox, which results in a substantial change in the velocity of slurry past the nip flap.

Figure 2:
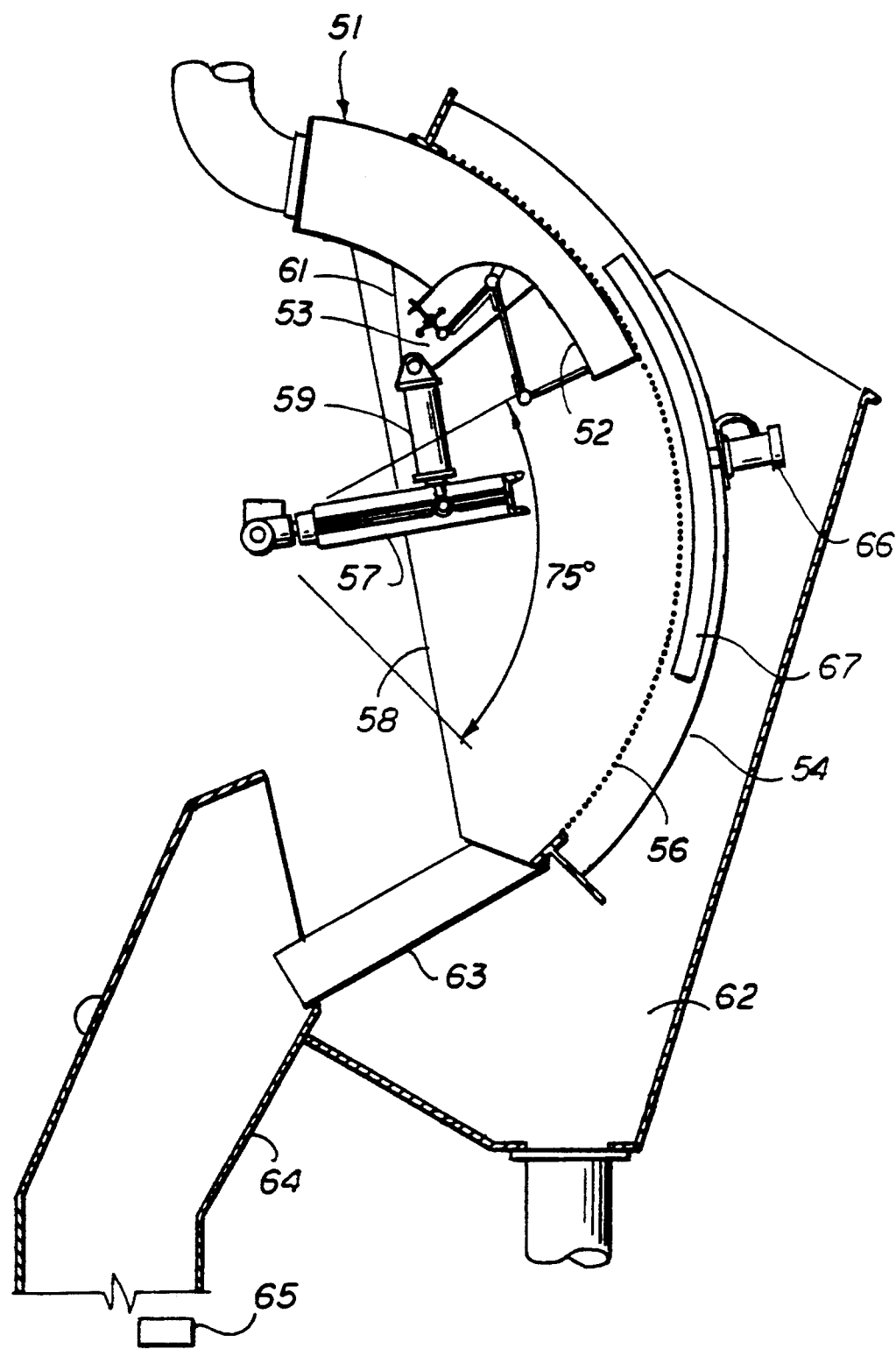
FIG. 2 is a cross-sectional view of a sieve bend which is provided with means for adjusting the exposed area of the sieve rack.

The embodiment of the invention shown in FIG. 2 makes use of a sieve rack which is adjustably mounted upon the bend structure. The bend structure 51 in this instance is indicated schematically and is presumed to have the same control means as in FIG. 1. Portion 52 is presumed to be the throat of the bend and the control means for the throat is shown schematically at 53. The sieve rack 54 consists of a frame which serves to mount the bars of the sieve 56. This assembly is arcuate as illustrated, and its upper portion is carried by and conforms with the curvature of the bend structure. The mounting is such that, when desired, the position of the sieve rack upon the sieve structure may be changed to incrementally expose a new area of the sieve to the flow discharging from the bend as needed to counteract the change in performance resulting from the gradual dulling of the exposed bars caused by particle abrasion. In other words, the sieve rack may ultimately be shifted to a position shown in FIG. 3 which exposes all of the sieve to the flow from the throat, whereby the unused portion of the sieve as illustrated in FIG. 2 is now exposed for use.

Figure 3:
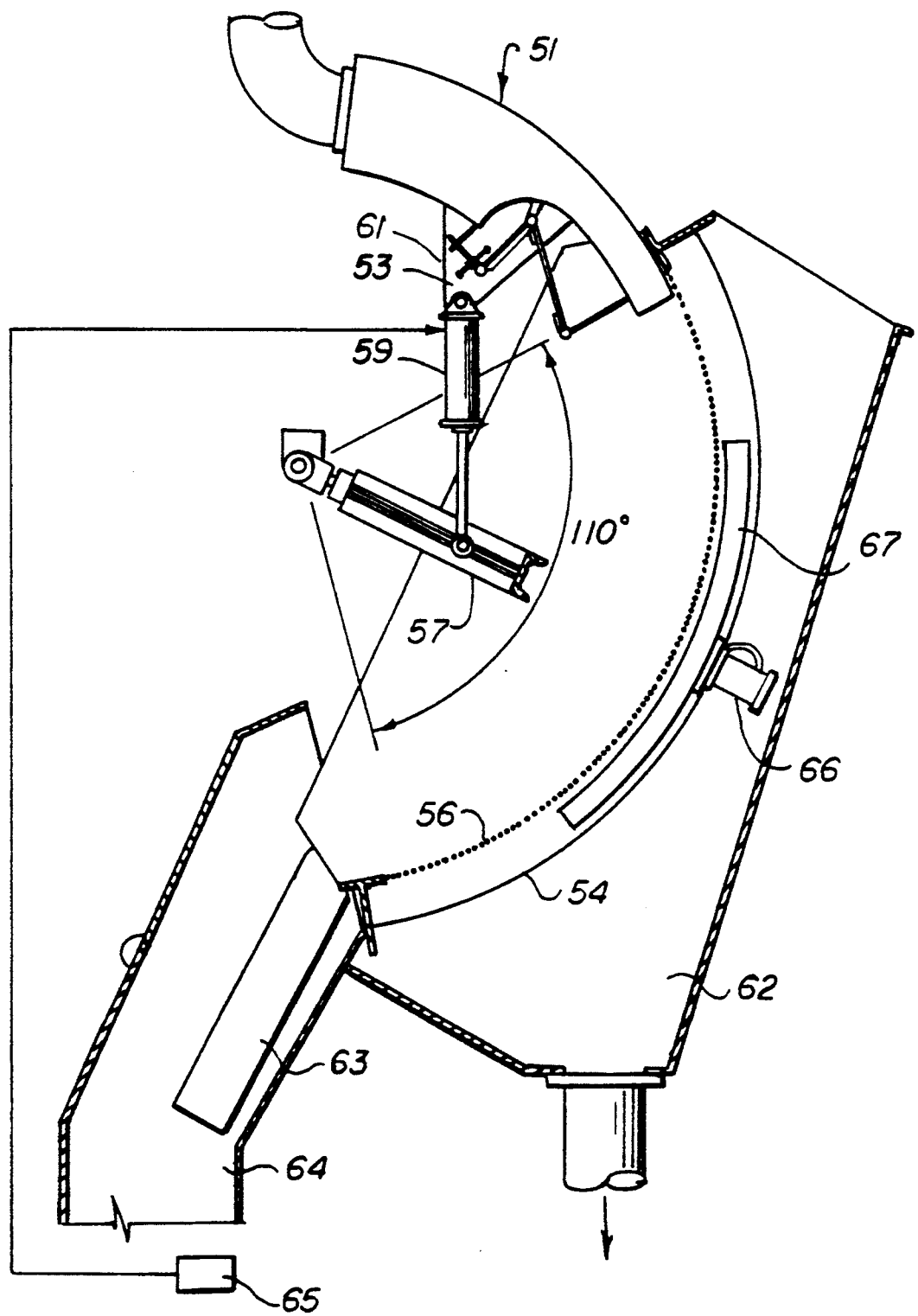
FIG. 3 is a cross-sectional view like FIG. 2 but showing the sieve rack in a different operating position.

After the apparatus' sizing performance eventually deteriorates below an acceptable level when in the position shown in FIG. 3, the sieve frame and screen must be turned. This is accomplished by rotating the screen frame until completely free of the headbox, spinning it 180 degrees on the screen's center radius and reinserting the previous discharge end behind the headbox to the position shown in FIG. 2. This operation essentially restores the original performance of the device and positions the screen to permit the screen exposure cycle to be repeated.

The means in this instance for shifting the position of the sieve rack consists of a member 57, which together with the walls 58 serve to carry the curved sieve rack. For automatic or remote operation, an operator 59 which may be motivated either pneumatically, hydraulically, or electrically, is pivotally connected to member 57, and is carried by the structural member 61. The lower end of the structure is provided with means for collecting the finer particles which pass through the slots of the sieve bars, and the oversized material. Thus, the fine particles are collected in the hopper 62, and the larger sized particles are removed by pan 63 and deposited in receptacle 64. Occasionally shifting of the sieve rack may be carried out from a remote station 65 which is indicated as having controlling connection with the operator 59. For example, assuming that the operator 59 is hydraulically operated, application or discharge of fluid from the operator may be controlled from the station 65. FIG. 3 is similar to FIG. 2 except that it shows the sieve rack shifted to a position where substantially all of the sieve is being supplied with slurry from the bend.

In the embodiments described above, it is desirable to provide means for applying a tapping action to the sieve. Thus as illustrated in FIG. 2 and 3, a device 66 which may be pneumatically operated, is attached to member 67 which is in close proximity with sieve screen. Continuous or occasional operation of the device 66 serves to apply tapping action to the sieve bars thus aiding in dislodging any accumulation of material in the screen apertures which otherwise might cause clogging and interfere with efficient operation.

Figure 4:
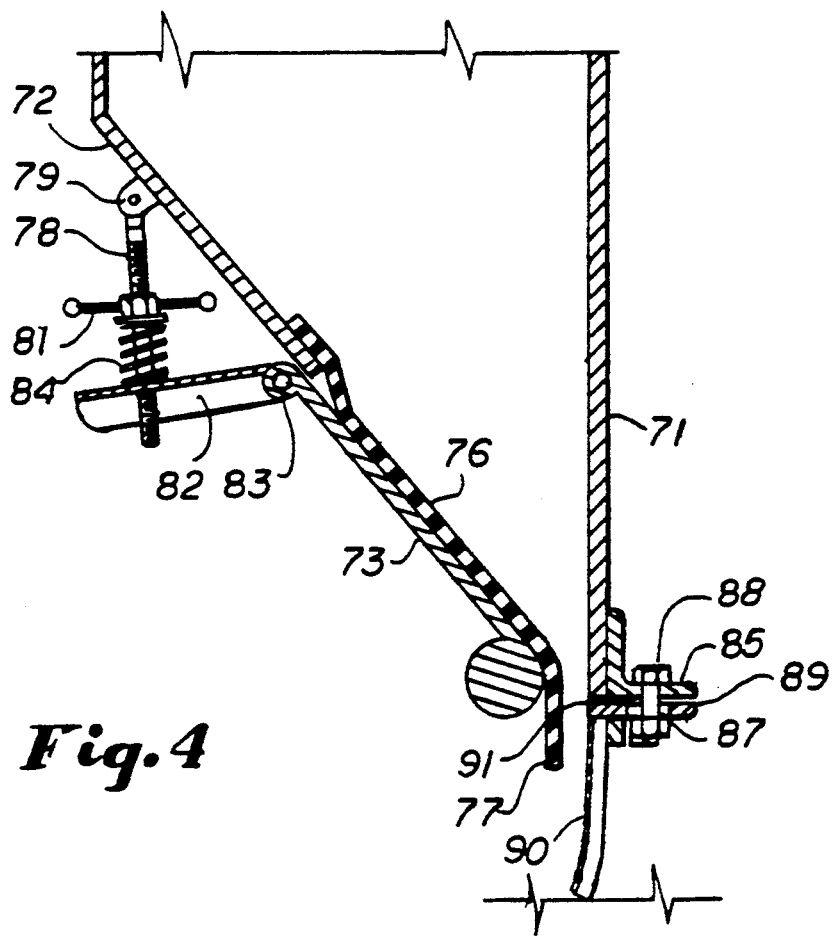
FIG. 4 is a cross-sectional view showing another embodiment of the apparatus.

FIG. 4 illustrates a modified sieve assembly for a sieve bend. This design embodies previous headbox throat features but instead of the sieve screen exposure being variable, this design has a fixed screen. Thus in this instance, vertical and inclined walls 71 and 72 define the lower part of the throat and extend upwards to the height necessary to achieve the desired static head. The control plate 73 extends from the lower edge of the inclined walls 72 and is provided with a facing 76 of resilient material. The lower portion 77 of this facing forms a nip flap. It overlaps the upper portion of the sieve. The adjusting means associated with the plate 73 includes a threaded rod 98 which is pivotally connected at 79 with the wall 72. The handwheel and nut 81 has threaded engagement with the rod 78 and the lower end of the rod is connected with the member 82. The upper end of plate 73 is pivotally connected by pivot 83 with a fixed member of the bend structure. Plate 73 is fixed with respect to member 82 and is pivotally connected at 83 with the structure of the bend. A helical spring 84 is positioned between member 82 and the nut of the handwheel 81. Thus during the course of automatic control, the helical spring 84 provides yieldable means serving to urge the plate 73 toward the right as viewed in FIG. 4. However, the thrust of spring 83 can be adjusted by manually turning the handwheel 81. A remote system may also be used to control this manual adjustment as well.

Also included in the modified sieve assembly shown in FIG. 4 is a detail that permits adjusting the alignment of the fixed sieve screen 90 tangent to wall 71. This is accomplished by providing flange 85 on the back of wall 71 and an inverted complementary flange 87 on the screen frame which holds the sieve screen. Flange 85 is fastened to flange 87 using machine bolts 88 placed in slotted holes 89. When the screen face 90 is tangent with wall 71, the machine bolts 88 are tightened, compressing the foam seal strip 91 between the upper edge of the screen 86 and the bottom edge of wall 71 and flange 89, and making a slurry tight seal that prohibits large particles in the feed slurry from leaking through the joint and contaminating the undersize particle flow.

An example of the invention is as follows: The bend was constructed with a throat substantially as shown in FIG. 1. The feed slurry was one such as produced in the coal industry comprised 5.8% of solid particles dispersed in water. The concentration of solids in the slurry was 2.5% of total coal particles ranging in size from smaller particles about 0.006 to 0.004 inches in diameter to large solids ranging from 0.02 to 0.006 inches in diameter. The particles also included about 35.7% of a clay associated mainly with the smaller particles. About 711 gallons of such slurry were pumped through a 2-foot wide, two-stage sieve bend system with plate 73 being adjusted to hold 30 inch static head and appeared to give best performance and capacity. Of the two fractions discharged, the product comprised solids concentrated in a range in size from 0.02 to 0.006 inches in diameter, with about 0.7 to 0.8% of clay particles. The other fraction ranged in size from about 0.006 to 0.0004 inches in diameter and contained about 58% of clay particles.

In the above example, the sieve had a capacity of 365 gallons per minute of slurry per foot of width. In contrast, typical sieve bends being used in the coal industry function at a capacity of only about 100 gallons per minute per foot of width. Tests with the Moorhead sieve indicate capacity advantages of about three times the conventional sieve bends currently being used in the coal industry.

What is claimed is:

1. Apparatus of the bend type for separating solid particles from a liquid medium, comprising body means forming a passage extending from an upper inlet to a lower outlet end, a throat of decreasing cross sectional area at the outlet end, the side walls at the lower end of the passage having a configuration such that a substantial length of the passage is arcuate, a movable plate having a nip flap depending therefrom forming one wall of the throat, means for adjusting said plate to vary the cross-sectional flow area of the throat, and a sieve assembly depending from the lower end of the passage and disposed to receive flow from the throat.

2. Apparatus as in claim 1 in which the upper end of the plate is pivotally attached to the body means and forms one side of the throat passage, together with spring means connected to the plate and serving to yieldably position the plate with respect to flow through the throat.

3. Apparatus as in claim 2 wherein the nip flap is formed of flexible material and one side of the nip flap is in contact with flow through the throat.

4. Apparatus as in claim 3 in which the nip flap is suspended from the lower end of the plate.

5. Apparatus as in claim 4 in which the nip flap directly faces a portion of the sieve.

6. Apparatus as in claim 2 together with manually operated means for manually adjusting the thrust of the spring means.

7. Apparatus of the bend type for separating solid particles from a liquid medium, comprising a structure forming a passage having an inlet end and a discharge end, the structure forming the passage having a configuration such that a substantial length of the passage is arcuate, and an arcuately curved sieve disposed to receive flow from the discharge end of the passage, said sieve extending from a point between the inlet and discharge ends of the passage to a point beyond the discharge end, with a portion of the sieve being unused and being positioned behind the arcuate portion of the passage and out of the path of the flow, the sieve being adjustable to move the unused portion of the sieve incrementally out from behind the passage and into the path of the flow and thereby incrementally expose new areas of the sieve to the flow.

8. In apparatus of the bend type for separating solid particles from a liquid medium: a bend structure defining a curved passage having an inlet end and a discharge end, a sieve screen mounted on the bend structure for receiving flow from the discharge end of the curved passage, and means for adjusting the position of the sieve screen relative to the discharge end to incrementally expose new areas of the sieve screen to the flow discharging from the passage.

9. The apparatus of claim 8 wherein the passage and the sieve screen are arcuately curved and disposed concentrically of each other, with the sieve screen being partially disposed behind the passage and being rotatable about the center of curvature of the passage to incrementally move new areas of the screen out from behind the passage and into the path of the flow.

10. The apparatus of claim 8 further including means permitting the sieve screen to be rotated 180° about an axis generally perpendicular to the flow so that the flow can impinge upon the screen from either of two opposite directions.

11. In apparatus of the bend type for separating solid particles from a liquid medium: a bend structure defining a curved passage having an inlet end and a discharge end, a throat of decreasing cross sectional area at the discharge end, means for varying the cross sectional area of the throat, a sieve screen mounted on the bend structure for receiving flow through the throat from the discharge end of the curved passage, and means for adjusting the position of the sieve screen relative to the discharge end to incrementally expose new areas of the sieve screen to the flow discharging from the passage.

12. The apparatus of claim 11 wherein the throat includes a movable plate which forms one wall thereof, and the means for varying the cross sectional area of the throat includes means for adjusting the position of the plate.

13. The apparatus of claim 11 wherein the passage and the sieve screen are arcuately curved and disposed concentrically of each other, with a portion of the sieve screen being positioned behind the passage and the sieve screen being rotatable about the center of curvature of the passage to move the sieve out from behind the passage in an incremental manner and thereby incrementally expose the new areas of the screen.

14. The apparatus of claim 11 further including means permitting the sieve screen to be rotated 180° about an axis generally perpendicular to the flow so that the flow can impinge upon the screen from either of two opposite directions.

15. In apparatus of the bend type for separating solid particles from a liquid medium: a bend structure defining a curved passage having an inlet end and a discharge end, a throat of decreasing cross sectional area at the discharge end of the passage formed in part by a movable plate with a flexible nip flap depending therefrom, means for adjusting the position of the plate to vary the cross sectional area of the throat, a sieve screen mounted on the bend structure for receiving flow through the throat from the discharge end of the curved passage, and means for adjusting the position of the sieve screen relative to the discharge end to incrementally expose new areas of the sieve screen to the flow discharging from the passage.

* * * * *